Figure 1:
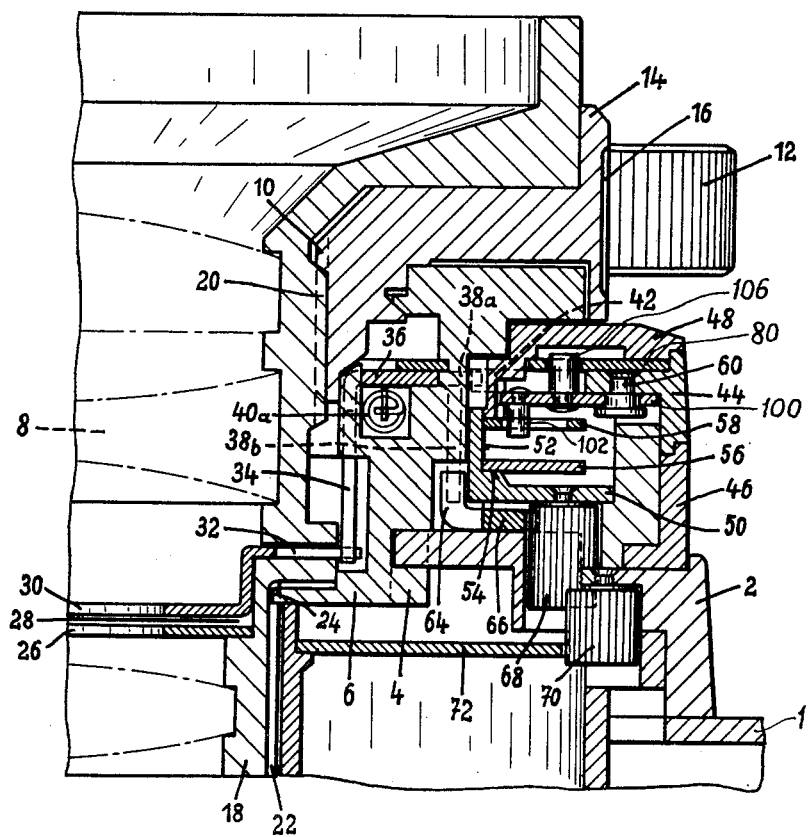

Aug. 14, 1962 K. GEBELE 3,049,065
DEPTH OF FIELD INDICATING MECHANISM FOR CAMERAS
WITH INTERCHANGEABLE OBJECTIVES
Filed Sept. 22, 1959 2 Sheets-Sheet 1

Aug. 14, 1962 K. GEBELE 3,049,065
DEPTH OF FIELD INDICATING MECHANISM FOR CAMERAS
WITH INTERCHANGEABLE OBJECTIVES
Filed Sept. 22, 1959 2 Sheets-Sheet 2

United States Patent Office 3,049,065
Patented Aug. 14, 1962

3,049,065
DEPTH OF FIELD INDICATING MECHANISM FOR CAMERAS WITH INTERCHANGEABLE OBJECTIVES
Kurt Gebele, Munich, Germany, assignor to Compur-Werk Friedrich Deckel oHG, Munich, Germany, a firm of Germany
Filed Sept. 22, 1959, Ser. No. 845,038
Claims priority, application Germany Sept. 26, 1958
6 Claims. (Cl. 95—64)

The present invention relates to photographic cameras with interchangeable objectives, and more particularly to such cameras having mechanism for indicating the depth of field, sometimes called the depth of definition.

As is well known, the depth of field mechanism must be operatively connected to the mechanism for adjusting the size of the diaphragm aperture, since the depth of field is a function of the size of the diaphragm aperture.

In recent years, interchangeable objectives (i.e., interchangeable lenses) have become quite popular. In most of the modern interchangeable objectives the adjustable diaphragm (usually but not always of the iris type) is built into the interchangeable objective unit, rather than being built into the camera. It has therefore become customary to mount the depth of field indicating mechanism also on the interchangeable unit, since the depth of field indicating mechanism must be coupled to the diaphragm aperture adjusting mechanism, as above mentioned.

An object of the present invention is to provide an improved construction so designed that the depth of field indicating mechanism may be built into the camera rather than into the interchangeable objective, and may remain with the camera when the interchangeable objective unit is removed and replaced by another interchangeable objective unit, although the adjustable diaphragm is mounted on and removable bodily with the interchangeable objective unit. This enables a simplification of the interchangeable unit, a reduction in the weight and size thereof, and a saving in expense, since only a single depth of field mechanism on the camera will suffice for use with a series of interchangeable objectives, instead of requiring a separate depth of field mechanism with each objective.

Another object of the invention is the provision of simplified and improved coupling means for coupling the diaphragm actuating mechanism on the interchangeable unit to the depth of field mechanism on the camera, and particularly the provision of such coupling means so designed as to be automatically coupled by the act of attaching the interchangeable objective unit to the camera and automatically uncoupled or disconnected by the act of removing the interchangeable unit from the camera, without the need for any special attention or care on the part of the operator.

A further object is the provision of coupling mechanism so designed as to be adaptable, with little or no change, both to interchangeable objective units for use with cameras of the rangefinder focusing type and to such units for use with cameras of the single lens reflex type, and also to such units designed for duplex use with cameras of both of the types just mentioned.

Figure 2:
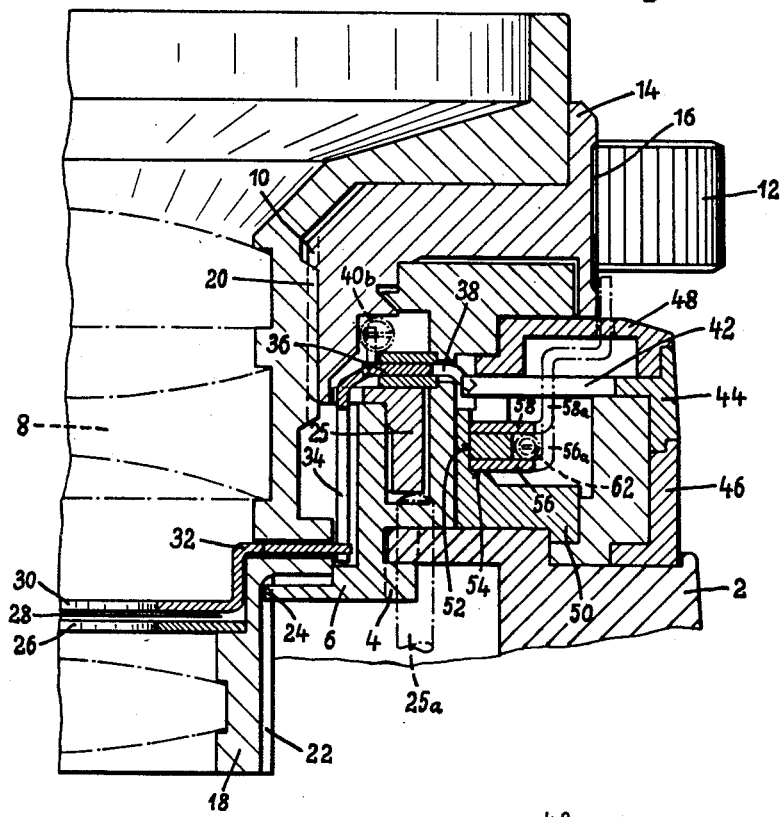
Figure 3:
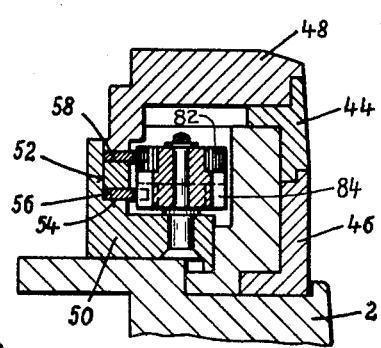

These and other desirable objects may be attained in the manner disclosed as an illustrative embodiment of the invention in the following description and in the accompanying drawings forming a part hereof, in which:

FIG. 1 is a fragmentary axial cross section illustrating the invention as embodied in an interchangeable unit applied to a camera of the single lens reflex type;

FIG. 2 is a similar view showing the form of unit applied to a camera of the rangefinder focusing type; and FIG. 3 is a fragmentary axial and radial section through the parts on the camera body which receive and support the interchangeable objective unit, showing additional details not seen in FIGS. 1 and 2, because the section in FIG. 3 is taken on a different radial plane from the radial planes of the sections of FIGS. 1 and 2.

The same reference numerals throughout the several views indicate the same parts.

Except for the parts specifically disclosed, the camera itself may be of any conventional kind and need not be shown in detail. It has a front wall 1, to which is firmly attached a mounting ring or bayonet ring 2 having conventional bayonet mounting lugs which mate in known manner with the bayonet lugs 4 on the body member 6 of the interchangeable objective unit containing the lens members 8. On the front end of the mount body 6 there is a focusing ring 14 mounted for rotation about the optical axis which passes through the centers of the lens members 8, but held against movement in an axial direction. This focusing ring 14 carries operating projections or finger grips 12, and also bears a focus distance scale in the location 16. As is customary, the scale is marked circumferentially on the ring 14, and is graduated in suitable units of distance (e.g., feet or meters), like the focus distance scale 117 on the focusing ring 32 in the copending U.S. patent application of Kurt Gebele, Serial No. 799,703, filed March 16, 1959 (now Patent 2,985,085, granted May 23, 1961).

The focusing ring 14 also has an internal screw thread 10 which meshes with an external screw thread 20 on the lens tube 18 which carries the lens members 8. The lens tube is guided on the body 6 for axial movement, but is held against rotation by a stationary projection 24 on the body 6 engaging in an axial groove 22 in the lens tube. Hence rotation of the focusing ring will move the lens tube 18 axially, to focus the image formed by the lenses 8 accurately upon the film held in the focal plane of the camera.

In the lens tube is the adjustable diaphragm mechanism, e.g., an iris diaphragm comprising the stationary ring 26, the adjustable diaphragm leaves 28, and the rotatable diaphragm operating ring 30, rotation of which serves to adjust the size of the diaphragm aperture. The actuating arm 32 of the ring 30 extends radially out of the lens tube through a slot which is lengthened circumferentially far enough to accommodate the maximum range of rotation of the ring 30. The outer end of the arm 32 extends into an axial slot in an arm 34 which extends axially rearwardly from the diaphragm actuating ring 36 mounted for rotation in the body 6 of the interchangeable unit. The slot connection of the axially movable arm 32 and the axially stationary arm 34 enables the operative connection to be maintained while the lens tube 18 is moved for focusing.

If the interchangeable lens mount or objective unit is designed for use with a single lens reflex camera, the diaphragm actuating ring 36 is provided with two driving devices in the form of projecting lugs 38a and 38b (FIG. 1), the former engaging with the diaphragm aperture setting or selecting ring rotatably mounted on the camera as explained below, the latter engaging with the camera shutter mechanism which serves to cock or tension the shutter ready for exposure and simultaneously to open the diaphragm to maximum aperture for focusing. If the interchangeable objective unit is designed for use only with a camera having rangefinder focusing, the second of these lugs may be omitted and the ring 36 may have only a single driving device or projecting lug 38 as seen in FIG. 2. In either case, the ring 36 is connected to one end of a coil spring 40a (FIG. 1) or 40b (FIG. 2), the other end of which is connected to a stationary anchoring post, which spring tends to turn the ring 36 (and thus the ring 30) in a direction to adjust the diaphragm aperture to minimum size. In the first case (unit for use with a single lens reflex camera) the spring 40a should be strong, so as to be able to close the diaphragm down to the preselected aperture in a very brief time. In the second case (unit for use only with a camera having rangefinder focusing) the spring 40b may be comparatively weak, since it need only cause the lug 38 of the spring 36 to remain in contact with and follow the movements of the aperture selecting or adjusting member on the camera. In the second case, the interchangeable unit also includes a rangefinder control cam ring 25 coupled to the focusing ring 14 to rotate with the focusing ring about the optical axis as a center. The cam 25 has a rise in an axial direction and presses against the front end of an axially extending feeler pin 25a mounted on the camera and serving to operate the rangefinder, as illustrated diagrammatically in FIG. 3 of the drawings of the copending U.S. patent application of Kurt Gebele, Serial No. 783,911, filed December 30, 1958 (now Patent 2,985,084, granted May 23, 1961). When the interchangeable unit is designed for alternative use either with a rangefinder camera or with a single lens reflex camera, the unit should have both the rangefinder control cam ring 25 and the two driving lugs 38a and 38b.

The diaphragm setting or selecting device on the camera comprises the external ring 44 rotatable about the optical axis and having an inwardly projecting radial arm 42 which makes contact with the lug 38 or 38a (as the case may be) on the ring 36 and determines how far the spring 40a or 40b can stop down the diaphragm toward the smallest aperture.

Next to the diaphragm setting ring 44 is an externally accessible shutter speed setting ring 46, likewise rotatable about the optical axis as a center. This speed setting ring is coupled in any conventional manner (the details of which are unimportant for purposes of the present invention, and therefore not shown) with the usual internal speed control ring or cam of the shutter. The details of the internal mechanism of the shutter, for opening and closing the shutter blades, are likewise unimportant for purposes of the present invention, and are not shown. Any conventional construction of shutter may be used, such as the construction shown in the copending United States application of Kurt Gebele, Serial No. 509,929, filed May 20, 1955 (now Patent 2,943,551, granted July 5, 1960), or in Gebele Patent 2,900,885, granted August 25, 1959.

Both of the rings 44 and 46 are rotatably retained between the stationary mounting member 2 at the rear and a stationary cover plate 48 at the front, the cover plate being screwed to the mounting member in the customary manner. The rings 44 and 46 may be coupled to each other either directly or through gearing of known form, for the adjustment of the exposure value. A supporting ring 50 is stationarily mounted between the bayonet mount 2 and the cover plate 48, and has an axially extending cylindrical surface 52 and a radially extending shoulder 54.

The cylindrical surface 52 forms the radial support for the two pointer rings 56 and 58 of the depth of field indicator, which rings are retained against axial movement on the cylindrical surface by being held between the radial shoulder 54 and a similar radial shoulder on the cover plate 48, with a stationary spacing sleeve between the rings.

These rings 56 and 58 carry pointer arms 56a and 58a, respectively, which extend forwardly through an arcuate slot in the cover plate 48, as seen in FIG. 2, and cooperate with the focus distance graduations of the focusing scale 16 to indicate the distance of the nearest and farthest objects which are in acceptably sharp focus for any given setting of the diaphragm aperture. Conveniently the depth of field indicating rings 56 and 58 are driven from the diaphragm setting ring 44 by intermediate driving mechanism of known form, e.g., the form shown in German Patent 1,031,629, or the form shown in the copending United States application of Franz Singer, Serial No. 555,964, filed December 28, 1955 (now Patent 2,926,588, granted March 1, 1960) (which is essentially the same, except for change in reference numerals, as the construction shown in FIG. 5 of U.S. Patent 2,901,957 of Fahlenberg, granted September 1, 1959) or the form shown in the copending United States application of Kurt Gebele, Serial No. 557,183, filed January 3, 1956 (now Patent 2,957,398, granted October 25, 1960), in which latter application the driving pin 96 corresponds to the pin 60 in FIG. 1 of the present application; the rings 76 and 78 of the prior application correspond respectively to the rings 58 and 56 of the present application; and the various members 80, 82, 84, 100, 102, and 106 of the prior application correspond to the parts bearing these same respective numerals in FIGS. 1 and 3 of the present application. These parts in the present application may be slightly different in shape and location from the corresponding parts in the prior application mentioned, but are the same in function, and will be readily understood by those familiar with the prior application. For taking up play, a coil spring 62 has one end connected to a suitable movable member of the depth of field indicating mechanism, such as the ring 56, and the other end connected to a stationary post.

Particular reference is made in the following description to the arrangement described in greater detail in the aforementioned application 557,183. In order to connect the depth of field pointer rings 56 and 58 in an operative manner to the diaphragm aperture setting ring 44, the ring 44 has securely fixed to it a pin 60 which extends rearwardly and serves as a pivot for one side of a plate 100. The plate 100 is preferably triangular and forms part of a transmission system interposed so that turning movements of the setting ring 44 may be transmitted to the pointer rings 56 and 58 in a non-linear manner as required for correct and accurate operation. This plate 100 carries a pin 102 which projects rearwardly into a radial slot formed in the ring 58, the radial slot being here unnumbered but corresponding to the slot 104 in application 557,183. On a different radius from the pin 60, spaced angularly from a radius drawn through the pin 102, the plate 100 also carries a second pin 106 which projects forwardly into a control slot or cam slot formed in the stationary plate 80. This slot is here unnumbered but corresponds to the slot 108 in the just mentioned application. This cam slot can be shaped in any manner required to swing the plate 100 on its pivot 60 at the same time that the pivot and plate travel bodily with the turning of the ring 44.

The two pointer rings 56 and 58 are coupled together in any conventional manner, not here illustrated, so that turning of the one ring in one direction causes turning of the other ring in the other direction by a like amount. For instance, a pinion may be in meshing engagement with teeth on the ring 58, while another pinion is in meshing engagement with teeth on the ring 56, the two pinions being in meshing engagement with each other. These pinions may correspond to the pinions 82 and 84 in the just mentioned application. Thus, whenever the plate 100 travels without turning on its pivot 60, the rings 56 and 58 will turn through the same extent as the ring 44, so that the pointers 56a and 58a will be brought closer together or farther apart, depending upon the direction of rotation of the ring 44, and the angular movements of the rings 56 and 58 will be the same as the angular movement of the ring 44, so long as no turning of the plate 100 occurs. However, through much of the range of travel of the parts, there is a non-linear relation between the turning of the ring 44 and the change in depth of field, as is well understood in the art. Hence by shaping the cam slot in the plate 80 into which the pin 106 extends to swing the plate 100 on its pivot 60 while it travels bodily with the pivot, the correct non-linear relation may be established between the turning movements of the ring 44 and the turning movements of the depth of field indicator rings 56 and 58.

When the interchangeable objective unit is used with a single lens reflex camera, the driving lug 38b is utilized for opening the diaphragm to its largest aperture, for maximum brilliance of the image in the viewfinder. To this end, the lug 38b is engaged by a driving device or lug 64 on the diaphragm aperture ring 66 rotatably supported on the stationary bayonet mounting ring 2. The ring 66 has gear teeth on part of its periphery, meshing with teeth on the pinion 68 rotatable on a stationary axle. This pinion meshes with a second pinion 70 also rotatable on a stationary axle. The second pinion meshes with gear teeth on part of the periphery of a driving ring 72 mounted on the camera and rotatable about the optical axis as a center.

The ring 72 is coupled in any known manner (hence not shown in detail) to the shutter mechanism in such a way that when the shutter is cocked or tensioned (preferably by operation of the film winding or transporting member) the ring 72 is rotated in one direction, thereby rotating the ring 66 so that the part 64 engages the part 38b and moves the ring 36 to open the diaphragm to the maximum aperture for focusing, against the force of the spring 40a. This driving ring 72 may correspond, for example, to the control ring 76 in British Patent 769,086 or in the similar U.S. application Serial No. 509,929, or the control ring 144 in U.S. Patent 2,900,885. When the shutter is tripped or released to make an exposure, the driving ring 72 rotates in the opposite direction at the beginning of the exposure operation, allowing the spring 40a to move the diaphragm in a closing direction until the lug 38a comes into contact with and is stopped by the arm 42 on the ring 44, the position of which serves to preselect the size of the aperture to which the diaphragm will be returned. Then, after the diaphragm is stopped down to the preselected size and the shutter blades are completely closed from the open focusing position, the shutter blades are opened and closed again to make the exposure, as well understood in the art.

The driving connection between the diaphragm ring 36 on the interchangeable objective unit and the cooperating parts on the camera is effected automatically by the act of twisting the interchangeable unit into place in the usual manner of bayonet connections, and is disengaged by the reverse twisting motion when the interchangeable unit is removed. The rotary range of movement of the ring 36 is less than the rotary twist required when engaging or disengaging the interchangeable unit, and the parts are so oriented that during the twisting in a disengaging direction, the lug 38 or 38a will always be moved out of contact with arm 42 even when the latter is in the position for largest aperture.

With this arrangement, only one set of parts for indicating depth of field is necessary, no matter how many interchangeable objective units are to be used with the camera. Thus the extra expense, weight, and size needed for inclusion of separate depth of field mechanism in each separate interchangeable unit are avoided. The manipulations required for removal and replacement of the interchangeable objective are reduced to a minimum, and no special attention is required for establishing or disconnecting the coupling between the movable parts on the camera and the movable parts on the interchangeable unit. Also the disclosed arrangement of the movable parts results in economy of space and ease of assembly, and this arrangement can be used advantageously with many different kinds or styles of cameras, regardless of whether the objective unit is interchangeable or is permanently mounted on the camera.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera assembly of the type including a camera unit, an interchangeable objective unit detachably and replaceably mounted on the camera unit, depth of field indicating mechanism including a circumferentially movable pointer adapted to cooperate with a circumferentially extending distance scale, and a diaphragm having an adjustable aperture, characterized by the fact that said diaphragm is part of said interchangeable objective unit and is removed bodily therewith when said objective unit is removed from the camera unit, said depth of field indicating mechanism is part of said camera unit and remains therewith when said objective unit is removed from said camera unit, and there is a detachable coupling operatively connecting said diaphragm and said depth of field indicating mechanism to vary the position of one in accordance with changes in the position of the other.

2. A construction as defined in claim 1, in which said detachable coupling is automatically coupled by the act of placing said objective unit in its normal operating position on said camera unit and is automatically uncoupled by the act of detaching said objective unit from said camera unit.

3. A construction as defined in claim 2, in which said interchangeable objective unit is detachably mounted on said camera unit by means of a bayonet connection, said units being twisted relative to each other in one direction to mount the objective unit on the camera unit and twisted in the opposite direction to disconnect the objective unit from the camera unit, characterized by the fact that the detachable coupling connecting the diaphragm to the depth of field indicating mechanism is operatively coupled by the act of twisting in the first mentioned direction and is uncoupled by the act of twisting in the second mentioned direction.

4. A photographic camera assembly of the type including a camera unit and an interchangeable objective unit detachably and replaceably mounted on the camera unit, said objective unit having an optical axis, said assembly comprising a diaphragm aperture selecting ring mounted on said camera unit for rotation thereon about the optical axis of the objective unit, a pair of depth of field indicating pointer rings also mounted on said camera unit for rotation about said axis, driving means mounted on said camera unit for rotating said pointer rings by rotation of said selecting ring, adjustable diaphragm mechanism mounted on said objective unit, said mechanism including a diaphragm actuating ring mounted on said objective unit for rotation about said optical axis and a spring on said objective unit tending to rotate said actuating ring in a direction to adjust the diaphragm to its smallest aperture, an arm on said actuating ring, and a cooperating part on said selecting ring for engaging said arm on said actuating ring to determine the extent to which said spring may turn said actuating ring in an aperture-reducing direction, whereby said depth of field pointer rings and said diaphragm actuating ring are both controlled in their respective positions by said selecting ring, and whereby said selecting ring and said pointer rings remain with said camera unit when said objective unit is detached and removed from said camera unit.

5. A construction as defined in claim 4, in which said objective unit is mounted on said camera unit by means of a bayonet connection and is twisted in one direction to attach the objective unit to the camera unit and twisted in the opposite direction to detach it, said arm on said actuating ring and said part on said selecting ring being located in such positions relative to each other that said arm and said part are brought into engagement with each other by twisting the objective unit in an attaching direction and are separated from each other by twisting the objective unit in a detaching direction.

6. A photographic camera assembly comprising, in combination, a camera unit having an optical axis, and an interchangeable objective unit detachably and replaceably mounted on the camera unit by a twisting movement of a minor fraction of a single revolution about the optical axis as a center, the camera unit including a diaphragm aperture selecting ring member mounted for rotation about the optical axis and remaining as part of the camera unit when the objective unit is detached therefrom, said camera unit also including a depth of field indicating pointer movable circumferentially with respect to the optical axis and operatively coupled to said aperture selecting ring member to be moved circumferentially by rotary movement of said ring member, the interchangeable objective unit including an adjustable diaphragm and a diaphragm actuating ring member and spring means tending to turn said diaphragm actuating ring member, the two ring members having cooperating contact portions so placed that when said objective unit is mounted in normal operative position on said camera unit said spring means tends to move a contact portion on the actuating ring member toward a cooperating contact portion on the selecting ring member so that the latter acts as a limit stop for determining the limit position to which the spring means may move the actuating ring member, said cooperating contact portions being so oriented with respect to each other and with respect to the camera unit and the objective unit that when the objective unit is twisted to a position releasing it from the camera unit, the contact portion on the actuating ring member will be moved out of engagement with the contact portion on the selecting ring member, the provision of the depth of field indicating pointer on the camera unit in combination with the control of the adjustable diaphragm on the objective unit through the cooperating contact portions on the two ring members enabling depth of field indicating mechanism on the camera unit to be use with any one of a plurality of different interchangeable objective units.

References Cited in the file of this patent

UNITED STATES PATENTS

| | | |
|---|---|---|
| 2,342,819 | Priesmann | Feb. 29, 1944 |
| 2,596,328 | Dorsey | May 13, 1952 |
| 2,805,610 | Haupt | Sept. 10, 1957 |
| 2,830,513 | Sauer | Apr. 15, 1958 |
| 2,926,576 | Gunther | Mar. 1, 1960 |
| 2,949,836 | Baab | Aug. 23, 1960 |